Oct. 11, 1927.
F. A. VOIGT
1,644,902
OBSERVATION APPARATUS FOR VEHICLES
Filed Dec. 22, 1925
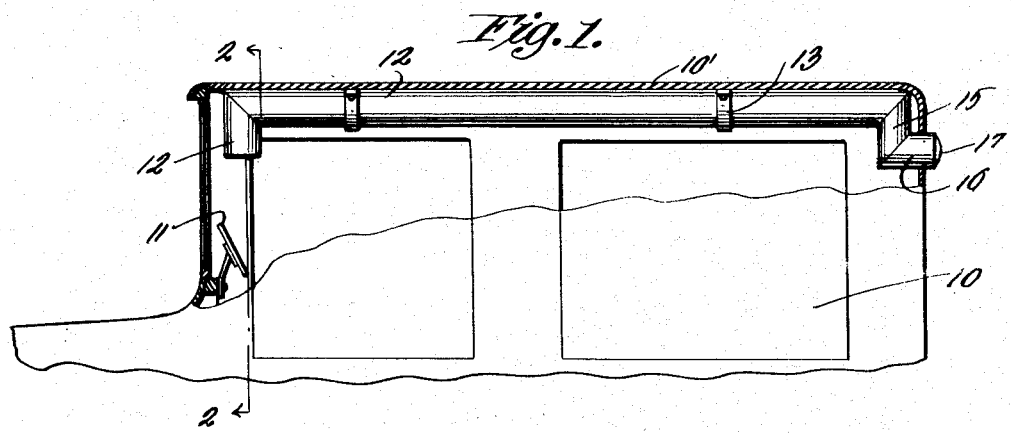
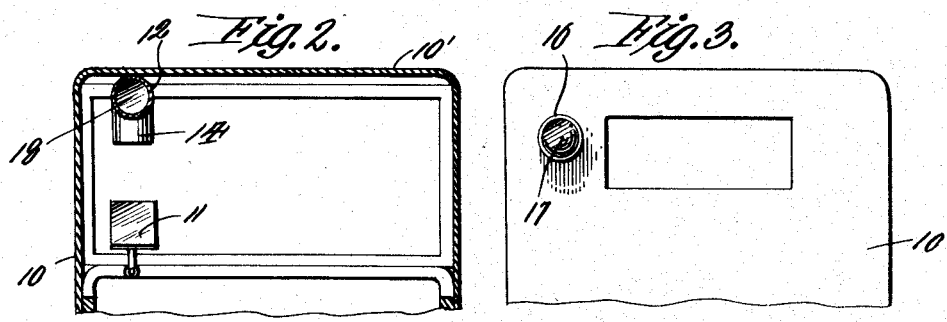
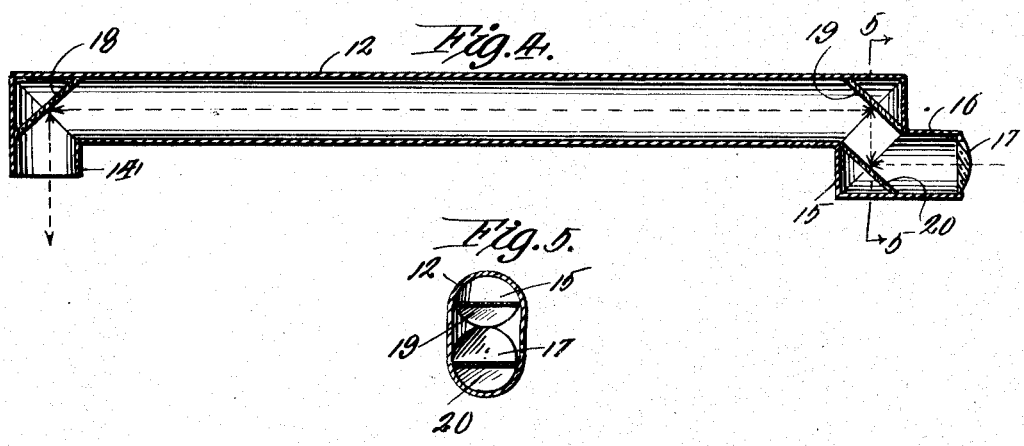
WITNESSES
Inventor
FREDERICK A. VOIGT
By
Attorney Patented Oct. 11, 1927.

1,644,902

UNITED STATES PATENT OFFICE.

FREDERICK A. VOIGT, OF CHICAGO, ILLINOIS.

OBSERVATION APPARATUS FOR VEHICLES.

Application filed December 22, 1925. Serial No. 77,070.

The present invention relates to vehicle attachments and has particular reference to observation apparatus therefor.

An important object of the invention is to provide an attachment to be mounted in association with vehicles, particularly of the closed type, whereby the operator may conveniently observe following vehicles and the like.

A further object of the invention is to provide an attachment of the above character which will enable the driver of the sedan type of automobiles to readily observe the rearward traffic.

A still further object of the invention is the provision of a simple and durable apparatus which may be conveniently installed in vehicles and which may be sold at a relatively low cost.

Other objects and advantages of the invention will become apparent as the description progresses.

In the accompanying drawing forming a part of this specification and in which like reference characters are employed to designate corresponding parts throughout the same:

Figure 1 is a fragmentary side elevational view of a vehicle partially broken away showing my improved attachment in position therein, Figure 2 is a transverse sectional view taken on the line 2—2 of Figure 1, Figure 3 is a fragmentary rear elevational view of the vehicle and attachment, Figure 4 is a central longitudinal sectional view through my improved apparatus, and Figure 5 is a transverse sectional view taken on the line 5—5 of Figure 4.

As will be well understood by those familiar with the operation of motor vehicles, considerable difficulty is experienced in determining the condition of traffic in the rear thereof, particularly in the enclosed type of vehicle bodies. In an effort to ascertain the location of following vehicles the driver must extend his head through a side window, which is extremely inconvenient, or turn about to look rearwardly through the rear window of the vehicle body. This method of observing the condition of the traffic in the rear of the vehicle is uncertain and certainly inconvenient, as it is possible that passengers may be seated on the rear seat of the vehicle obstructing the view of the driver, and the view obtained, is under all conditions, limited. With this in mind, my invention relates to the provision of an apparatus in the nature of an altiscope whereby the vehicle operator may readily observe traffic conditions at the rear of the vehicle without substantial movement or distracting his attention from the operation of the vehicle.

Referring now to the drawing, the numeral 10 generally designates a vehicle body, in the present instance of the sedan type equipped, at a position adjacent the dash board, with a conventional type of reflecting mirror 11, arranged to be conveniently adjusted in angular position. Securely fastened in position in the body against the top 10' thereof is a longitudinal tube section 12 preferably of circular formation firmly secured in position against the top of the vehicle by retaining clamps 13. Secured to the forward portion of the tube section 12 is a downwardly projecting comparatively short extension section 14, while the rear end of the tube carries a similar rear extension 15 and an offset horizontal projecting section 16. The rear extremity of the projecting section 16 is enclosed by a circular transparent plate 17 which may be formed of plain glass or in the nature of magnifying lens. Mounted in an angular position at the forward connection of the main tube section 12 and extension 14 is a reflector 18 arranged to direct the rays from a vertical to a horizontal direction. Disposed in a complemetary position at the opposite end of the section 12 at the elbow connection thereof with the extension 15 is a reflector 19 arranged in an elevated vertically aligned position, and a similar reflector 20 mounted in the connection of the extension 15 and projecting section 16. It is readily apparent, that the mirrors 19 and 20 are in parallel angular positions so as to direct the light rays through the objective lens and through the tubular sections.

As clearly illustrated in Figures 2 and 3 of the drawing, the observation apparatus is preferably disposed adjacent one side of the car body, corresponding to the side on which the driving apparatus is mounted. The reflecting mirror 11 secured to the dash board of the vehicle is disposed directly beneath the forward section 14 and adjusted so that the operator of the vehicle may conveniently obtain a clear view of the traffic conditions in the rear of the vehicle through the instrumentality of the observation tube structure.

It is evident, from the foregoing description, that a simple and efficient observation apparatus has been devised, generally comprising a longitudinal observation tube having a comparatively short downwardly disposed extension at the forward end and an angular extension at the rear end for convenient installation on the vehicle. The apparatus will facilitate the operation of the vehicle and reduce the danger of accidents. The present structure will enable the operator to ascertain at all times the positions of following vehicles relative his own vehicle and thus determine the necessity for signalling when coming to a stop, or reversing the direction of the vehicle for parking or other purposes.

It is to be understood that the form of my invention herewith shown and described is to be taken as the preferred example of the same, and that the structure may be modified as to the shape and size without departing from the spirit of the invention or the scope of the subjoined claim.

Having thus described my invention, I claim:

An observation apparatus comprising an adjustable mirror, a horizontally arranged tube, a downwardly directed extension at one end of the tube and arranged in spaced alinement with said mirror, a vertical tube section at the other end of the tube, a horizontal tube section extending from the lower end of said vertical section, a lens in said horizontal section, a pair of parallelly spaced reflectors mounted at the point of juncture of said sections, and a third reflector arranged at the point of juncture of the extension and tube.

In testimony whereof I affix my signature.

FREDERICK A. VOIGT.